United States Patent
Garg et al.

(10) Patent No.: US 9,071,529 B2
(45) Date of Patent: Jun. 30, 2015

(54) METHOD AND APPARATUS FOR ACCELERATING FORWARDING IN SOFTWARE-DEFINED NETWORKS

(71) Applicant: Telefonaktiebolaget L M Ericsson (publ), Stockholm (SE)

(72) Inventors: Vipin Garg, Sunnyvale, CA (US); Eric Ward Gray, Pitman, NJ (US); David Ian Allan, San Jose, CA (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 248 days.

(21) Appl. No.: 13/647,100

(22) Filed: Oct. 8, 2012

(65) Prior Publication Data
US 2014/0098669 A1 Apr. 10, 2014

(51) Int. Cl.
*H04L 12/801* (2013.01)
*H04L 12/721* (2013.01)
*H04L 12/741* (2013.01)

(52) U.S. Cl.
CPC ............... *H04L 47/12* (2013.01); *H04L 45/38* (2013.01); *H04L 45/54* (2013.01)

(58) Field of Classification Search
CPC ......... H04L 47/10; H04L 47/12; H04L 45/64; H04L 45/38
USPC ......... 370/229, 235, 237, 351, 389, 412, 428, 370/429, 464, 474
See application file for complete search history.

(56) References Cited

U.S. PATENT DOCUMENTS

| | | | |
|---|---|---|---|
| 2004/0030927 A1* | 2/2004 | Zuk | 713/201 |
| 2011/0261825 A1* | 10/2011 | Ichino | 370/400 |
| 2011/0273988 A1* | 11/2011 | Tourrilhes et al. | 370/237 |
| 2011/0310894 A1* | 12/2011 | Karino | 370/389 |
| 2012/0008629 A1* | 1/2012 | Chiba et al. | 370/392 |
| 2013/0070762 A1* | 3/2013 | Adams et al. | 370/389 |
| 2013/0155902 A1* | 6/2013 | Feng et al. | 370/255 |

FOREIGN PATENT DOCUMENTS

WO WO-2012090355 A1 7/2012

OTHER PUBLICATIONS

"OpenFlow Switch Specification", Sep. 6, 2012, 128 pages, Version 1.3.1 (Wire Protocol 0x04), The Open Networking Foundation.
"OpenFlow Switch Specification," Jun. 25, 2012, 106 pages, Version 1.3.0 (Wire Protocol 0x04), The Open Networking Foundation, downloaded from https://www.opennetworking.org/images/stories/downloads/specification/openflow-spec-v1.3.0.pdf.

* cited by examiner

*Primary Examiner* — Obaidul Huq
(74) *Attorney, Agent, or Firm* — Nicholson De Vos Webster & Elliot LLP

(57) ABSTRACT

A network element acting as a forwarding plane within a software-defined network to reduce negative effects of slow-path packet processing is described. The network element, upon receiving a first packet, determines whether it matches any flow entry within a set of flow tables. When the first packet does not match any flow entry of the set of flow tables, the network element performs a miss procedure including inserting at least a portion of the first packet into a packet miss table of the network element, which is accessed by a controller. The controller may access the packet miss table using a pull mechanism. The miss procedure may also include accessing a configurable default rule table of the network element, which includes rules enabling limited forwarding for those packets that do not match any entry of the set of flow tables.

24 Claims, 5 Drawing Sheets

METHOD AND APPARATUS FOR ACCELERATING FORWARDING IN SOFTWARE-DEFINED NETWORKS

FIELD

Embodiments of the invention relate to the field of networking; and more specifically, to accelerating forwarding in software-defined networks.

BACKGROUND

In recent years, traditional circuit-based communication networks have declined in favor of packet-based networks, which can be more flexible, efficient, and secure. As a result, the increased popularity of packet-based networking has led to growth in demand for packet-based network devices. This demand has largely been met by manufacturers, who have created larger and larger monolithic routers to handle an increased volume and complexity of network traffic. However, this model is approaching its technologic and economic limits. It is increasingly difficult to fulfill the increasing performance requirements with traditional router designs, and, with the emergence of low cost data center hardware, router vendors have difficulty justifying the higher costs of hardware for the same performance. At the same time, the demands on the routing and switching control plane in access and aggregation networks are becoming more complex. Operators desire the ability to customize routing to handle specific types of traffic flows near the edge, configure customized services that span aggregation networks, and achieve multi-layer integration, without the detailed low-level configuration required in today's networks.

These trends led to a different approach to routing architecture in which data and control planes have been decoupled. With this separation, the control plane may be logically centralized and implemented with a variety of hardware components with varied architectures. Further, the data plane may consist of simplified switch/router elements configured by the logically centralized controller. This new split-architecture model focuses on the split of control from forwarding and data processing elements and is at the core of software-defined networking (SDN). One prominent standard for flow processing in software-defined networks is OpenFlow, which defines the protocols used to transport messages between the control plane and the forwarding plane and describes a model for packet processing.

This split-architecture of software-defined networks enables a separation between functionalities that can be logically or physically grouped together. For example, there can be a split or separation between a common control entity and a network application (e.g., Generalized Multi-Protocol Label Switching (GMPLS), Border Gateway Protocol (BGP), Internet Protocol Security (IPSec), etc.). Similarly, there can be a split or separation between control and forwarding/processing (i.e. a separation of central control from network devices performing packet processing). There also can be a split or separation of a data forwarding functionality, a data processing functionality, and a data generation functionality (e.g., Deep Packet Inspection (DPI); Ciphering; Operations, administration and management (OAM); etc.).

Software-defined networks present many advantages over traditional monolithic architecture networks. For example, the control plane applications that implement important network routing and switching functionalities are completely separated from the forwarding plane. Thus, maintaining a centralized control plane enables highly customized and optimized networking services that can be tailored to specific user needs. A centralized control plane provides a highly scalable, reliable, and flexible networking infrastructure that can cater to diverse user needs. The forwarding plane (or data plane) devices can be inexpensive and interchangeable commodity networking devices, which reduces the overall configuration and maintenance burdens for the user. Additionally, a single management and configuration entity for the entire network enhances the ease-of-use experience for users.

However, current SDN configurations also suffer from shortcomings. While systems such as OpenFlow do present valid ways to specify a model for packet processing, a problem exists in that different or novel traffic received at the forwarding plane cannot be processed until the control plane provides the forwarding device with instructions for that traffic. Accordingly, when packets of a new traffic flow first enter a SDN, these initial packets are unable to be forwarded until the control plane has provided the forwarding devices within the SDN with forwarding instructions for the flow. Further, to enable the control plane to decide what to do with these initial packets of a new flow, the packets are typically transmitted by the forwarding devices to the control plane. In SDNs employing many forwarding devices in the forwarding plane that may receive many such "unknown" packets, such packet transmission to the control plane can overwhelm the network and control plane with traffic.

SUMMARY

According to one embodiment of the invention, a method is performed by a network element acting as a forwarding plane within a software-defined network to reduce negative effects of slow-path packet processing. The method includes receiving, by the network element, a first packet. The method further includes determining whether the first packet matches any flow entry within a set of one or more flow tables of the network element. This set of flow tables include a set of one or more flow entries, each of which includes a match criteria to be matched against match portions of incoming packets. Each of the flow entries also includes a set of one or more actions to be performed for packets having said match portions that match the match criteria of that flow entry. The method also includes performing a miss procedure responsive to determining that the first packet does not match any flow entry within the set of flow tables. The miss procedure includes inserting at least a portion of the first packet as a first entry in a packet miss table (PMT). The PMT stores portions of packets received by the network element that did not match any flow entry of the set of flow tables. The miss procedure also includes providing, to a controller, access to the first entry of the PMT upon the controller seeking such access. In an embodiment, the network element determines that the controller seeks this access when the network element receives, from the controller, a pull entry request message indicating a request for one or more unprocessed entries of the PMT. In an embodiment, the network element provides access to the controller by transmitting a pull entry response message to the controller that includes the requested entry or entries of the PMT. Additionally, in some embodiments of the invention, the miss procedure further comprises comparing the first packet to a set of one or more entries of a configurable default rule table (CDRT) by determining whether a match portion of the first packet matches a CDRT match criteria from any of the set of entries. Each entry of the CDRT includes the CDRT match criteria to be used to determine whether packets match that entry. Each entry of the CDRT also includes a format specifier that indicates how to construct entries in the PMT for packets that match that entry.

According to another embodiment of the invention, a method is performed by a first network element acting as a controller within a software-defined network to reduce negative effects of slow-path packet processing. The method includes accessing unprocessed entries of a packet miss table (PMT) of a second network element acting as a forwarding plane in the software-defined network. Each entry of the PMT stores portions of packets received by the second network element that did not match any entry within a set of one or more flow tables of the second network element. The set of flow tables include a set of one or more flow entries, each of which includes a match criteria to be matched against a match portion of incoming packets. Each of the flow entries also includes a set of one or more actions to be performed for packets having the match portion that matches the match criteria of that flow entry. The method further includes, responsive to the accessing of the unprocessed entries of the PMT, causing the second network element to insert a set of one or more flow entries into one or more of the set of flow tables. In an embodiment, the first network element accesses the unprocessed entries of the PMT by transmitting to the second network element a pull entry request message indicating a pull request for the unprocessed entries of the PMT and also receiving, from the second network element, a pull entry response message including a set of one or more unprocessed entries of the PMT.

In an embodiment of the invention, a network element acts as a forwarding plane within a software-defined network (SDN) and reduces negative effects of slow-path packet processing. The network element includes a set of one or more physical network interfaces. The set of physical network interfaces are configured to receive packets to be forwarded. The set of physical network interfaces are also configured to provide, for a controller in the SDN, access to unprocessed entries of a packet miss table (PMT) upon the controller seeking said access. The PMT is to store portions of packets received by the set of physical network interfaces that do not match any flow entry of a set of one or more flow tables. The network element also includes a packet processing module configured to configure the set of one or more flow tables. The set of flow tables include a set of one or more flow entries, each including match criteria to be compared to match portions of incoming packets. Each of the set of flow entries also includes a set of one or more actions to be performed for packets having a match portion that matches the match criteria of the flow entry. The packet processing module is also configured to determine whether match portions of received packets match the match criteria of any of the set of flow entries of the set of flow tables. The packet processing module is also configured to perform a miss procedure when a received packet does not match any entry of the set of flow tables. This miss procedure is either inserting at least a portion of the received packet as an entry of the PMT, or updating an existing entry of the PMT based upon the received packet.

In another embodiment of the invention, a network element acts as a controller within a software-defined network and reduces negative effects of slow-path packet processing. The network element includes a set of one or more physical network interfaces and a control module coupled to the set of physical network interfaces. The control module is configured to access unprocessed entries of a packet miss table (PMT) of a second network element acting as a forwarding plane in the software-defined network. Each entry of the PMT stores portions of packets received by the second network element that did not match any entry within a set of one or more flow tables of the second network element. The set of flow tables include a set of one or more flow entries, each of which to include match criteria to be compared to match portions of incoming packets. Each flow entry is also to include a set of one or more actions to be performed for packets having the match portion that matches the match criteria of that flow entry. The control module is also configured to, responsive to the accessing of the unprocessed entries of the PMT, transmit, to the second network element, one or more flow entry modification messages. The one or more flow entry modification messages indicate a command to insert a set of one or more flow entries into one or more of the set of flow tables.

In embodiments of the invention, "miss" packets that do not match any entry in the flow tables may be instantly processed (according to a configurable default rule table) instead of having to be held until instructions from a controller arrive. Further, instead of transmitting these missed packets to the controller (and perhaps overwhelming the controller), the missed packets (or complete or partial copies thereof) may be stored in the forwarding plane until the control plane is ready to process them.

According to another embodiment of the invention, a method is performed by a first network element acting as a controller within a software-defined network to reduce negative effects of slow-path packet processing. The method includes accessing unprocessed entries of a packet miss table (PMT) of a second network element acting as a forwarding plane in the software-defined network. Each entry of the PMT stores portions of packets received by the second network element that did not match any entry within a set of one or more flow tables of the second network element. The set of flow tables include a set of one or more flow entries, each of which includes match criteria to be compared to match portions of incoming packets. Each of the flow entries also includes a set of one or more actions to be performed for packets having the match portion that matches the match criteria of that flow entry. The method further includes, responsive to the accessing of the unprocessed entries of the PMT, causing the second network element to insert a set of one or more flow entries into one or more of the set of flow tables. In this embodiment, the first network element accesses the unprocessed entries of the PMT by using an existing cache-coherency mechanism provided by the operating systems—or an included software subsystem—of the first and second network elements that allows the first and second network elements to each behave approximately as if the data of the PMT is located in the local memory of that network element. For this embodiment, weak cache coherency is both sufficient and desirable. With weak coherency, it is possible that some cache inconsistency will occur, but owing to the mechanism of the invention, this will result in—at worst—slightly sub-optimal performance as inconsistent entries will result in some degree of re-processing of PMT entries. This is more than off-set by the relative simplicity of a weak cache coherency mechanism.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
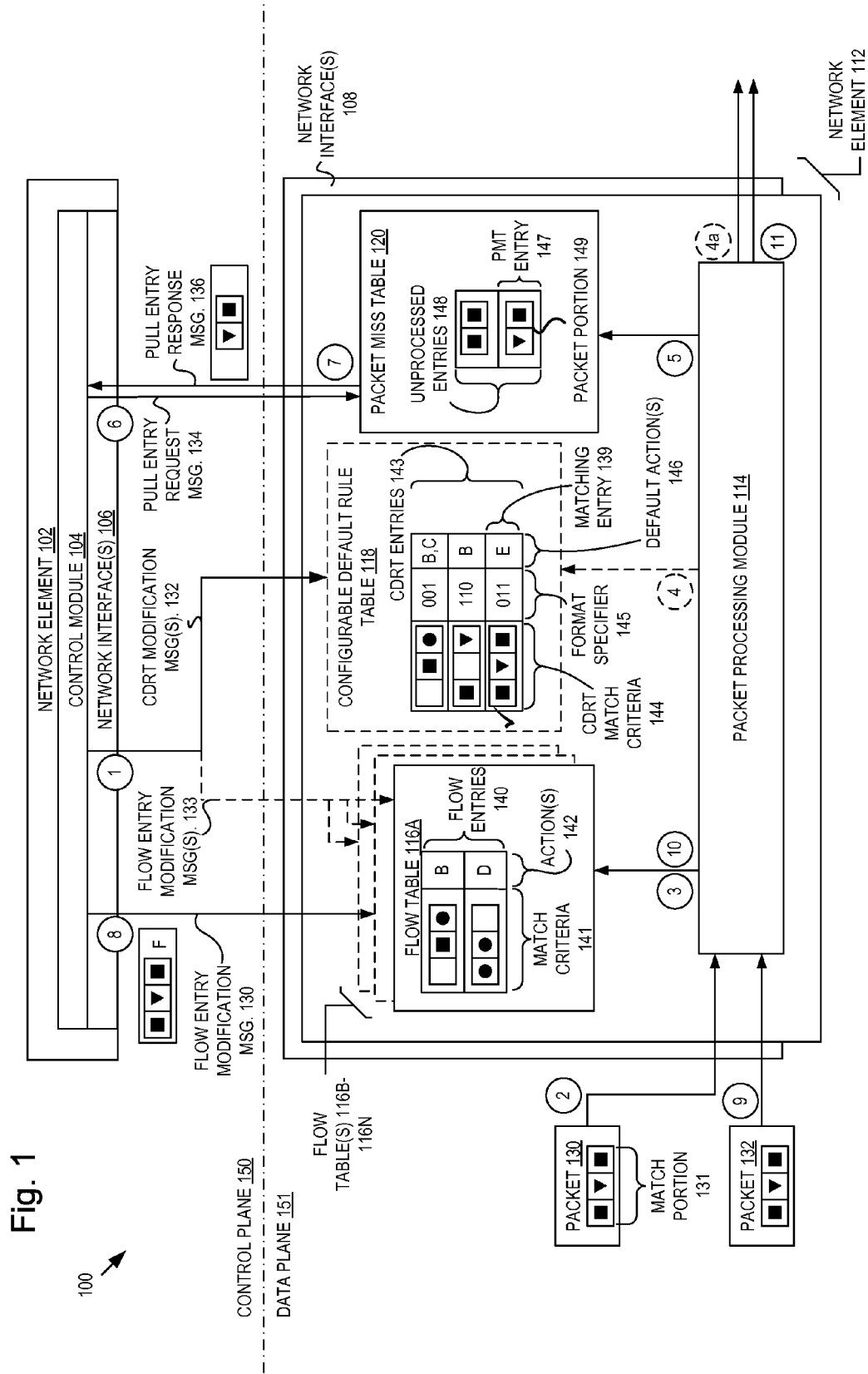
FIG. 1 illustrates a portion of a software-defined network with accelerated forwarding according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device (e.g., an end station, a network element) stores and transmits (internally and/or with other electronic devices over a network) code (composed of software instructions) and data using computer-readable media, such as non-transitory tangible computer-readable media (e.g., computer-readable storage media such as magnetic disks, optical disks, read only memory, flash memory devices) and transitory computer-readable transmission media (e.g., electrical, optical, acoustical or other form of propagated signals—such as carrier waves, infrared signals). In addition, such electronic devices typically include a set of one or more processors coupled to one or more other components, such as one or more non-transitory machine-readable media (to store code and/or data), user input/output devices (e.g., a keyboard, a touchscreen, and/or a display), and network connections (to transmit code and/or data using propagating signals). The coupling of the set of processors and other components is typically through one or more busses and bridges (also termed as bus controllers). Thus, a non-transitory computer-readable medium of a given electronic device typically stores instructions for execution on one or more processors of that electronic device. One or more parts of an embodiment of the invention may be implemented using different combinations of software, firmware, and/or hardware.

As used herein, a network element (e.g., a router, switch, bridge) is a piece of networking equipment, including hardware and software, which communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Traditionally, network elements are commonly separated into a control plane and a data plane (sometimes referred to as a forwarding plane or a media plane). In the case that the network element is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS)), Label Distribution Protocol (LDP), Resource Reservation Protocol (RSVP)) that communicate with other network elements to exchange routes and select those routes based on one or more routing metrics. Alternatively, a network element may only implement a data plane (forwarding plane) or only implement all or part of a control plane. This separation of duty is common in split-architecture network models. The term "split-architecture network" is largely synonymous for the term "software-defined network" (SDN), and the terms may be used interchangeably herein.

Typically, a network element includes a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network element through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway)). By way of example, a service card may be used to terminate IPsec tunnels and execute the attendant authentication and encryption algorithms.

Software-Defined Networks

Unlike monolithic network architectures that require complex network management functions to be distributed in the control planes of multifunctional network elements throughout the network, and further require complex data and control planes integrated into the same multifunctional network element, a flow-based software-defined network allows the data planes of the network to be separated from the control planes. Data planes can be implemented as simple discrete flow switches (forwarding elements) distributed throughout the network, and the control planes providing the network's intelligence are implemented in a centralized flow controller that oversees the flow switches. By decoupling the control function from the data forwarding function, software-defined networking eases the task of modifying the network control logic and provides a programmatic interface upon which developers can build a wide variety of new routing and protocol management applications. This allows the data and control planes to evolve and scale independently, while reducing the management necessary for the data plane network components.

The control plane, or controller, typically controls the forwarding planes through a control plane signaling protocol over a secure and reliable transport connection between the forwarding elements and the controller. The controller typically includes an operating system that provides basic processing, I/O, and networking capabilities. A middleware layer provides the context of the software-defined network controller to the operating system and communicates with various forwarding plane elements using a control plane signaling protocol. An application layer over the middleware layer provides the intelligence required for various network operations such as protocols, network situational awareness, and user-interfaces. At a more abstract level, the application layer works with a logical view of the network and the middleware layer provides the conversion from the logical view to the physical view.

In an embodiment of a software-defined network paradigm, each forwarding element is a flow switching enabled network device. The flow switching enabled network device forwards packets based on the flow each packet belongs to instead of the destination IP address within the packet, which is typically used in current conventional packet switched IP networks. A flow may be defined as a set of packets whose headers match a given pattern of bits. In this sense, traditional IP forwarding is also flow-based forwarding where the flow is defined by the destination IP address only. Instead of just considering the destination IP address or the source IP address, though, generic flow definitions allow many fields (e.g., 10 or more) in the packet headers to be considered.

The control plane transmits relevant messages to a forwarding element based on application layer calculations and middleware layer mapping for each flow. The forwarding element processes these messages and programs the appropriate flow information and the corresponding actions in its flow tables. The forwarding element maps packets to flows and forwards packets based on these flow tables. Of course, flow tables may be implemented in a variety of data structures, such as maps, lists, arrays, files, tables, relational databases, etc. Further, the discussion of columns and rows within these tables is arbitrary; while one implementation may choose to put entries in rows it is trivial to modify the data structure to put entries in columns instead. In addition, the forwarding element may need to have data processing and data generation capabilities for such importation operations as DPI, NetFlow data collection, OAM, etc.

Standards for flow processing define the protocols used to transport messages between the control and the forwarding plane and describe the model for the processing of packets. This model for processing packets in flow processing devices includes header parsing, packet classification, and making forwarding decisions.

Header parsing describes how to interpret the packet based upon a well-known set of protocols (e.g., Ethernet, virtual local area network (VLAN), multiprotocol label switching (MPLS), IPv4, etc.). Some layers of headers contain fields including information about how to de-multiplex the next header. For example, an Ethernet header includes a field describing what type of header is in the next layer. Some protocol fields are used to build a match structure (or key) that will be used in packet classification. For example, a first key field could be a source media access control (MAC) address, and a second key field could be a destination MAC address.

Packet classification involves executing a lookup in memory to classify the packet by determining which flow entry in the flow tables best matches the packet based upon the match structure, or key, of the flow entries. It is possible that many flows can correspond to a packet; in this case the system is typically configured to determine one flow from the many flows according to a defined scheme (e.g. selecting a first flow entry that is matched).

Making forwarding decisions and performing actions occurs based on the flow entry identified in the previous step of packet classification by executing actions using the packet. Each flow in the flow table is associated with a set of actions to be executed for each corresponding packet. For example, an action may be to push a header onto the packet, forward the packet using a particular port, flood the packet, or simply drop the packet. Thus, a flow entry for IPv4 packets with a particular transmission control protocol (TCP) destination port could contain an action specifying that these packets should be dropped.

However, when an unknown packet (for example, a "missed packet" or a "match-miss" as used in OpenFlow parlance) arrives at the data plane (e.g. at a forwarding device), the packet—or a subset of the packet header and content—is typically immediately forwarded to the control plane (or controller). The controller, which executes software that defines a process for deciding how to handle packets and program corresponding entries in the data-plane, will then program flow table entries (also known as flow entries) into forwarding devices in the data plane to accommodate packets belonging to the flow of the unknown packet. In some instances, upon the controller receiving a "missed" packet from a forwarding device, the controller will also forward the packet to a destination that it determines to be appropriate. This controller-based forwarding is sometimes referred to as slow-path processing, which can be detrimental and/or pathological to the network.

Among other pieces of information, programmed flow table entries define both a specific set of match criteria (a set of values or wildcards, or an indication of what portions of a packet should be compared to a particular value/values/wildcards, as defined by the data plane's matching capabilities—i.e.—for specific fields in the packet header, or for some other packet content), and an action or set of actions for the data plane to take on receiving a matching packet. However, the programmed match criteria may only match a subset of packets that may be received (either for a port or the system). In this likely case, additional "unknown" packets will also be forwarded to the controller.

Once a specific flow table entry has been programmed by the controller, when a next packet with matching credentials arrives, it matches the created entry in the data plane and the forwarding device takes the action associated with the matched entry.

Existing SDN mechanisms can cause network issues such as congestion and packet loss when, for example, a new node is added to the network because the node's flow table is empty. Because there are no entries in the flow tables associated with this new node, all the traffic associated with this new node would be forwarded to the controller, until specific forwarding entries have been created in the flow tables of this node by the controller, and all packet types are handled according to the one default "match-miss action" (typically discarded with OpenFlow) or some other single default forwarding action (again most likely being discarded). For example, OpenFlow allows programmers to program a default rule for unknown packets, such as "Drop all" or "Forward all". Since control plane packet processing capabilities are slower than the rate at which packets can be received by the data plane and forwarded to the control plane, this can overwhelm the controller's processing capabilities, causing congestion at the controller and potentially catastrophic delays in the network.

For this reason, a typical forwarding device disables the matching feature and does not forward information to the controller until doing so is explicitly enabled (by the controller itself, typically). As a result, no packets are forwarded until the newly installed—or created—forwarder(s) are fully configured.

A similar problem can also occur when someone purposely sends a very high quantity of traffic such that all (or nearly all) received packets have 'new' credentials and thus appear to be "unknown" to the data plane. The resulting forwarding of all this traffic to the controller may also overwhelm the control plane and can potentially bring down all or a portion of the network. Such an occurrence is one common vector for a Denial of Service (DoS) attack.

Existing SDN implementations may avoid overwhelming the controller by implementation design. For instance, a separate processor may be used strictly to handle the receipt and storing of incoming control traffic. This approach can—under worst case conditions—allow the implementation to start discarding all control packets it receives when these packets would otherwise overwhelm the controller. However, there are a number of problems with this approach. First, for any of a number of reasons (incompatible design, scale considerations, etc.) an implementation may not implement this capability. As a result, it is quite possible that a controller implementation can be overwhelmed if the forwarding plane (or forwarding device) is sending a higher-than-normal volume of traffic to the controller—even if the forwarding device has been fully configured—as a result of changes in network traffic. A second problem with the approach utilizing a separate processor that potentially discards control packets is that discarding new traffic as a result of back-logged older traffic is well-known to be an issue, often to the point of inducing pathological network behavior.

A further problem with existing SDN implementations is that the first packet of any as of yet unclassified flow will experience potentially significant processing delay as a result of the different treatment received (the controller performing slow-path processing through analysis of the packet) in comparison with the remaining packets in the flow. Thus, the frequency of out-of-order packet delivery events will be higher with any such approach. As a result, packet-based rule creation as a result of slow-path processing of un-matched traffic may lead to out-of-order delivery, and/or excessive delay variation, in a flow. Additionally, the transmission of each "missed" packet to the controller can be quite costly as this data consumes the resources of the forwarding elements and forwarding links in the network.

Embodiments of the invention present a SDN configuration useful to avoid these problems and thereby accelerate the speed of forwarding in the network. Embodiments of the invention do not require the SDN implementation to be OpenFlow compliant. However, embodiments of the invention utilize structures and concepts related to those presented by OpenFlow, such as flow tables (also known as match tables) used by forwarding devices, and the ability of the control plane (or controller) to perform packet-based rule creation by processing packet information and determine configuration information needed to program the forwarding devices to recognize "new" flows and forward these packets accordingly and/or provide new match criteria that makes it possible for the forwarding device to provide more appropriate packet information to the controller when a subsequent packet of the same flow is received by the forwarding device.

Overview

In embodiments of the invention, the controller first identifies the service types any forwarding node is supposed to provide in the given network and, based on this information and optionally further based upon on other information such as network topology, defines a set of default forwarding rules for the data path. Additionally, the controller may have a prioritized list of configuration steps based upon the device type, which it will begin to program into a configurable default rule table (CDRT) of the forwarding device. Thus, based on the device type and the prioritized list of configuration steps, the controller can then enable limited forwarding after having completed such a partial configuration. In embodiments of the invention, the controller continues with these prioritized configuration steps in parallel with limited forwarding performed by the forwarding device using actions defined in entries of the CDRT until such time (if ever) as configuration is completed.

Such a configuration enables limited, but useful forwarding to quickly occur. For example, this configuration allows for early initiation of device-type-specific control protocols in the network such as the Spanning Tree Protocol (STP), Shortest Path Bridging (SPB) for a bridge, or a site-specific routing protocol (such as Open Shortest Path First (OSPF), Intermediate System to Intermediate System (IS-IS), Interior Border Gateway Protocol (iBGP), etc.) for a router. Additionally, depending upon the device type, it may be preferable not to discard packets by default. For example, an Ethernet bridge may be configured with a default action of 'Flood', which is a common operation for such bridges.

Additionally, the capability to immediately allow a limited amount of forwarding can be critical in SDN applications where device types may be instantiated as one or more virtual devices using generic, fully programmable, forwarding devices where full configuration may require an excessive amount of time.

After the partial configuration (based on device type) has been completed, and some subset of packet forwarding is enabled, packet-based rule creation begins. When an unknown packet (i.e. packet for which there is no more specific action or rule configured in the flow tables) is received by the forwarding plane, the forwarding plane executes the default forwarding action associated with the packet from a CDRT entry of the CDRT. This occurs without involving the control plane in the forwarding for this specific packet.

As this packet is processed, a portion (or all) of the packet is copied into forwarding device local memory (such as a Packet Miss Table (PMT)). In some embodiments, additional telemetry for the flow associated with the packet is copied into the PMT, such as a time of receipt of the packet, or the time since a packet with the same credentials has arrived. The control plane subsequently pulls entries from the data plane local memory at its own rate (independent of data plane processing), processes it, and creates a more specific entry (or multiple more specific entries) in the set of flow tables.

In these embodiments, because the controller works exclusively with packets or portions of packets proactively retrieved from the forwarding plane local memory, the slow path is never used for forwarding, thus avoiding delay variation of packets in a flow and potential out of order delivery of those packets.

In contrast, in OpenFlow-based systems, the presumption is that the forwarding device will push the "missed packet" flow information to the controller for further processing. Since the controller may be (and is often) executing on a separate physical device, the forwarding device does not necessarily know the processing capabilities of the controller. This lack of information on the part of the transmitting node—the forwarding device—can potentially create congestion at the controller, the loss of traffic, and the controller having an incomplete picture of the actual traffic matrix in the network. While OpenFlow 'Packet-In' and 'Packet-Out' messages help to manage such buffers at the controller, these messages add extra messaging on the network.

In embodiments of the present invention, because the controller pulls packet information at its own convenience, the forwarding device cannot overwhelm the controller. Thus, when there are many forwarding devices in the SDN and many "unknown" packets arriving at the forwarding devices, the controller will be able to process these "unknown" packets at its own pace instead of being overwhelmed by a deluge of forwarded packet information.

Further Detail

The general approach used in embodiments of the invention is to identify the services expected from forwarding devices in a network, and then accordingly program the default actions for the unknown (miss) packets in configurable default rule tables (CDRTs) of each device. This information may be determined in advance for each device type that may be used in a specific network, and applied to new devices as they are added to the network, based on the type and location in the topology of this new device. In addition, in certain embodiments, the controller pulls packet information for which there are as yet undefined specific forwarding entries, processes this information, and creates the specific missing entry or entries (typically in the flow tables, but in some embodiments, within the CDRTs).

In some embodiments, a most commonly applicable default action for use within entries of the CDRTs will be to discard matching packets, as this action effectively simulates the same thing that would occur if the device was not present (or not yet enabled) in the network. In these scenarios, discarding the packet will most likely result in the re-transmission of the discarded packet after some delay. Other default actions are also useful, such as flooding unmatched packets for devices that play the role of an Ethernet bridge in the SDN.

In an embodiment of the invention, the default action includes data plane forwarding instructions to be used to perform the limited forwarding of the packet. In some embodiments, the default action also includes a format specifier indicating what portions of the packet are to be stored in data plane local memory (e.g. the Packet Miss Table) and made available to the controller. For example, a format specifier may indicate that, for any packet matching that particular CDRT rule, the first 50 bytes of the packet shall be stored as an entry in the PMT. The number of bytes (in this example, 50) may be configured based on type of service that device is supposed to provide in the network. For one service type, this might be determined to be the number of bytes from the packet needed to be able to include potential header information that would be used as part of a more specific match criteria to be constructed by the controller for a flow entry to be placed in the flow tables of the forwarding device. In other embodiments, the format specifier is an index value for semantically organized packet content specific to any device type whose function the implementation is designed to support. For example, a format specifier may be defined where the semantic is that the stored data include only specific bit-position (or ranges of bits) likely to be key for specific packet types (e.g. Ethernet frame header fields, IPv4 packet header fields, IPv6 packet header fields, etc.).

In embodiments of the invention, default actions can be defined per port (or virtual port) or per device (or device instance) for specific device types, or for all devices in a network.

FIG. 1 illustrates a portion of a software-defined network (SDN) 100 with accelerated forwarding according to one embodiment of the invention. The SDN depicted contains a first network element 102 functioning as a controller and a second network element 112 functioning as a forwarding plane. However, in alternate embodiments, one or both of the first network element 102 and second network element 112 execute as virtual network elements, and thus can execute on together on one physical device or split among a plurality of physical devices.

In this diagram, portions of packets are illustrated with common shapes such as squares, triangles, circles, and empty boxes. These symbols may represent a range of data values including a particular bit, group of bits, byte, or group of bytes in these packets. As such, these data values may be packet header fields or data from within the payload of the packet or datagram. Each data value, though depicted as possibly being immediately adjacent to one another, may or may not be sequential data values within the packet.

At circle '1', the control module 104 of the network element 102, through the network interfaces 106, may optionally configure one or more of flow tables 116A-116N of the second network element 112 by inserting one or more flow table entries 140 into the flow tables via one or more flow entry modification messages 133. In contrast to OpenFlow-type networks, where entries of the flow table are only added by a controller after a forwarding device has received a packet that "missed" in its flow table and forwarded that packet to the controller for analysis, in this depicted embodiment the flow table entries 140 are proactively installed by the control module 104. Thus, the flow table entries 140 installed in this optional first configuration do not result from traffic that "misses" in the flow tables. Traffic that "misses" the flow tables is that traffic having a match portion 131 (e.g., a set of packet header fields, packet payload values, or other packet locations) that does not match a match criteria 141 (a set of values and/or wildcards) of any flow entry of the set of flow tables 116A-116N. Each entry of the flow tables 116A-116N includes a match criteria 141 and a set of one or more actions to execute for any traffic having a packet match portion 131 matching the match criteria 141 of that flow entry. This optional configuration, in some embodiments, bases the flow table entries 140 upon a determined device type of the second network element 112. In some embodiments, the flow table entries 140 are from a stored set of previous flow table entries, either from the same network element 102 or a similar network element, which may be stored by the network element 102 or by some external device.

Also at circle '1', the control module 104 transmits a set of one or more CDRT modification messages 132 to populate a configurable default rule table (CDRT) 118 of the second network element 112. Similar to the optional configuration described above with respect to the flow entry modification messages 133, these CDRT modification messages 132 are issued by the control module 104 in an effort to enable limited forwarding by the second network element 112, and thus do not occur (at this stage) responsive to any traffic "missing" the flow tables 116A-116N. Each CDRT entry, in the depicted embodiment, includes a CDRT match criteria 144 (similar to a flow table 116A match criteria 141), a format specifier 145, and a set of one or more default actions 146. After a packet (e.g. 130) "misses" the set of flow tables 116A-116N, the packet's match portion 131 is compared to the CDRT match criteria 144 to determine a set of default actions 146 to be executed with the packet. Further, the format specifier 145 indicates which portions of the packet are to be placed in a Packet Miss Table (PMT) 120. At this stage, the packet processing module 114 is enabled to perform limited packet forwarding of traffic even before the network element 112 has received any non-control module 104 oriented traffic whatsoever. The CDRT entries 143 may be generated by the control module 104 based upon a determined device type of the second network element 112, the location of the second network element 112 in the SDN, and/or the expected service(s) the second network element 112 will perform as a whole or on a port-by-port basis. The transmission of CDRT modification messages 132 may also be used at a later point responsive to changes within the SDN; for example, if a new port is added to a forwarding element in the SDN, or if the second network element 112 changes roles in the SDN (perhaps due to a network topology change).

At circle '2', a first packet 130 is received at the network interfaces 108 of the network element 112 and is directed, at circle '3' by the packet processing module 114, to be matched against the set of flow tables using the packet's match portion 131 and the match criteria 141 of the flow entries 140 of the flow tables 116A-116N. In the depicted embodiment, assuming the only flow entries 140 include the two entries illustrated as part of flow table 116A (space/square/circle, and circle/circle/space), the match portion 131 (square/triangle/square) of the first packet 130 will not have a match in the flow table 116A. Accordingly, a flow table "miss" occurs for the first packet 130.

At optional circle '4', the packet 130 is compared to CDRT entries 143 of the configurable default rule table 118 by determining whether the match portion 131 matches any of the CDRT match criteria 144 of the CDRT entries 143. (Note that in some embodiments, the match portion 131 to be matched against the flow table 116A match criteria 141 is different than the match portion 131 to be matched against the CDRT match criteria 144 of the CDRT 118.) In the illustrated embodiment, assuming the CDRT 118 only includes three CDRT entries 143 (space/square/circle, square/space/triangle, and square/triangle/square), the packet 130 matches the third entry 139. Accordingly, the set of one or more default actions 146 are to be performed with the packet 130. In the depicted embodiment, the set of default actions 146 (represented as 'E') dictates that the packet 130 is to be forwarded (at circle '4a') out one of the network interfaces 108 to a particular destination. Additionally, the format specifier 145 of the matched entry 139 is utilized by the packet processing module 114 to determine what entry is to be inserted into the Packet Miss Table 120. As described earlier herein, the format specifier 145 may be a value, range of values, or set of codes indicating what portions of the packet are to be inserted into the PMT 120. In the depicted embodiment, the format specifier 145 for each of the CDRT entries 143 is a bitmap indicating which portions of the packet 130 are to be used—here, the format specifier 145 of '011' indicates that the second and third header field values of the packet are to be inserted into the PMT 120.

Thus, at circle '5', the packet processing module 114 inserts a PMT entry 147 into the PMT 120 that includes a packet portion 149 that is the second and third header fields values of the packet 130—or the triangle and square. In embodiments where the CDRT 118 is not utilized, a particular defined packet portion 149 is defined for all packets that "miss" in the flow tables 116A-116N—for example, a fixed range of bytes or the entire packet are options for the packet portion 149. At this point, there are two unprocessed entries 148 in the PMT 120 that are deemed unprocessed as they have not yet been accessed by the control module 104. The first unprocessed entry was inserted into the PMT 120 at a period in time before the packet 130 was received, which is not depicted herein.

After some amount of time, and assuming no other packets have been received by the second network element 112, the control module 104 at circle '6' accesses the PMT 120 to seek any unprocessed entries 146. As described elsewhere herein, the control module 104 may access the PMT 120 in a variety of ways, such as utilizing. Distributed Shared Memory (DSM) or a signaling protocol. In the depicted embodiment of FIG. 1, the control module 104 transmits a pull entry request message 134 seeking a latest one of the unprocessed entries 148 of the PMT 120. In other embodiments, the pull entry request message 134 may seek an earliest one, a random one, a subset or defined quantity of, or all of the unprocessed entries 148 of the PMT 120. This pull entry request message 134 is a "pull" message in that it enables the control module 104 to proactively seek the acquisition of data instead of passively waiting for data to be sent at the convenience of another network device. In some embodiments, the unprocessed entries 148 are deleted from the PMT 120 or marked as being processed or in the process of being processed at this point. In other embodiments, the unprocessed entries 148 deleted or marked as processed only when a later flow entry modification message 130 pertaining to that entry is received from the control module 104, which indicates that the control module 104 successfully received and processed that formerly-unprocessed entry of the PMT 120. The control module 104 will then periodically or immediately check for additional unprocessed entries 148 throughout operation of the SDN.

At circle '7', the network element 112 responds to the pull entry request message 134 with a pull entry response message 136 that includes the packet portion 149 of the latest PMT entry 147 representing the first packet 130.

Responsive to receipt of the pull entry response message 136, the control module 104 processes the included packet portion 149 to generate a new flow entry to be included in one of the flow tables 116A-116N. This new flow entry is sent as part of a flow entry modification message 130, which instructs the network element 112 to insert the new flow entry into a flow table (e.g. 116A) or edit an existing flow table entry to be equivalent to the new flow entry.

If possible, the control module 104 creates a specific flow entry in the flow tables 116A-116N containing the match criteria 141 and specific action(s) 142 to be taken, and causes the PMT entry 147 information it has just processed to be removed from or otherwise marked as invalid in the PMT 120. Depending upon the embodiment, of course, the removal of unprocessed entries 148 after their processing by the control module 104 may or may not require specific action by the control module 104. In one embodiment, the control module 104 causes the PMT entry 147 to be marked as "processed" if this was not done previously. In an embodiment where the PMT 120 maintains a pointer to keep track of a next unprocessed entry (e.g. one of 148), this pointer is now moved to a next unprocessed entry.

When creating the specific flow entry in the flow tables 116A-116N, the control module 104 may create an entry in the flow tables 116A-116N that is largely similar to an existing matching entry 139 in the CDRT, aside from the fact that it does not specify the content (via the format specifier 145) to be inserted into the PMT 120. Additionally, the control module 104 may be configured to remove entries in the flow tables 116A-116N, thus triggering a refresh of that entry, or allowing for a different behavior to be defined as a different specific action 142 subsequently upon receipt of packets that previously matched the match criteria 141 of the removed entry. In some embodiments, entries of the flow tables 116A-116N are able to be configured to be automatically removed by aging out the entry (i.e. if the entry is not hit/refreshed in some amount of time, it is removed).

Then, at circle '9', the network element 112 receives a second packet 132 belonging to a same flow as the first packet 130, as indicated by it having the same match portion (square/triangle/square). At circle '10', the second packet 132 is compared to the flow tables 116A-116N and will match the newly added flow entry just inserted (but not depicted) by flow entry modification message 130. Thus, the set of actions of that newly added flow entry (represented by 'F') will be performed for the second packet 132 by forwarding the packet using one or more network interfaces 108 at circle '11', and the CDRT 118 will not need to be examined.

While processing of this second packet 132 is similar to that of the processing of a packet belonging to an established flow (i.e. that does not miss in a flow table) in a traditional SDN, one key difference is clearly illustrated with respect to processing of the first packet 130 of a flow and other packets of the flow arriving shortly thereafter the first packet 130. In traditional SDN environments, the first packet 130 would miss in the set of flow tables (e.g. 116A), and would forwarded to the controller for analysis. During this time, subsequent packets belonging to the flow may arrive and may similarly be sent to the controller (and likely dropped by the forwarding plane). This process continues in the forwarding plane until the controller is able to program the forwarding plane with one or more additional flow table entries capable of identifying and processing packets of this flow. However, in embodiments of the invention and the embodiment identified in FIG. 1, the first few packets for a flow will miss at the flow tables 116A-116N but may still be instantly be processed due to the set of actions 146 in CDRT entries 143 of the CDRT 118. Similarly, information describing these packets (such as packet portions 149 and other packet-related telemetry, which is not illustrated) will be maintained in the PMT 120 and only transmitted to the controller (i.e. control module 104) when the controller seeks this information. Further, this unprocessed entry 148 information from the PMT 120 may be sent aggregated in only a few network messages to the controller. Accordingly, in such embodiments of the invention, the first packets of a flow are immediately able to be processed, and the controller and network are not inundated with control traffic related to "unknown" packets.

Figure 2:
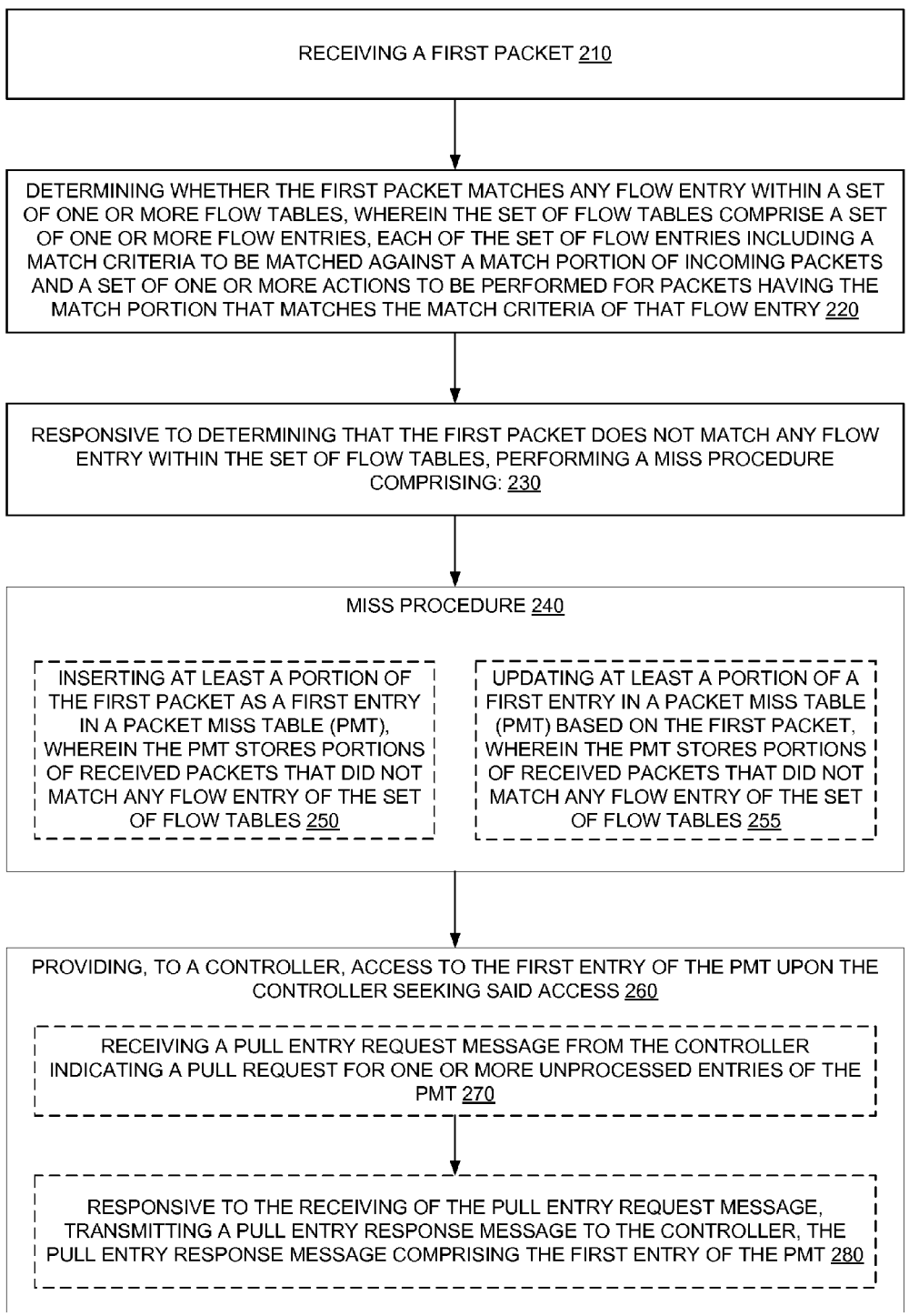
FIG. 2 illustrates a flow performed by a forwarding element in a software-defined network for accelerating forwarding according to one embodiment of the invention.

FIG. 2 illustrates a flow 200 performed by a forwarding plane in a software-defined network for accelerating forwarding according to one embodiment of the invention. The operations of this and other flow diagrams will be described with reference to the exemplary embodiments of the other diagrams. However, it should be understood that the operations of the flow diagrams can be performed by embodiments of the invention other than those discussed with reference to these other diagrams, and the embodiments of the invention discussed with reference these other diagrams can perform operations different than those discussed with reference to the flow diagrams. Though the flow diagrams in the figures show a particular order of operations performed by certain embodiments of the invention, it should be understood that such order is exemplary (e.g., alternative embodiments may perform the operations in a different order, combine certain operations, overlap certain operations, etc.).

At 210, the forwarding plane receives a first packet, and then determines whether the first packet matches any flow entry within a set of one or more flow tables 220. The set of flow tables comprise a set of one or more flow entries that each include a match criteria to be matched against match portions of incoming packets and a set of one or more actions to be performed for packets having said match portions that match the match criteria of that flow entry.

Responsive to determining that the first packet does not match any flow entry within the set of flow tables, the forwarding plane performs a miss procedure 230. This miss procedure 240, in an embodiment, includes inserting at least a portion of the first packet as a first entry in a packet miss table (PMT) 250. The PMT stores portions of packets received by the forwarding plane that did not match any flow entry of the set of flow tables 250. In some embodiments, this insertion occurs for every packet that is found not to match any flow entry within the set of flow tables; however, in some embodiments, the insertion into the PMT occurs when there is no entry existing in the PMT that describes the packet. In these embodiments, when a packet is received that misses in the set of flow tables, the miss procedure 240 includes updating at least a portion of a first entry in the PMT based upon that packet 255. This update may include updating a counter in the first entry that indicates how many packets are represented by that entry (i.e. how many packets have been received by the forwarding plane that "missed" in the flow tables that are described by that entry), updating a "last received" time to indicate the time that a last packet matching that PMT entry was received, etc.

At 260, the forwarding plane provides, to a controller in the software-defined network, access to the first entry of the PMT upon the controller seeking said access 260. In some embodiments of the invention, the forwarding plane detects that the controller seeks said access by receiving a pull entry request message from the controller indicating a pull request for one or more unprocessed entries of the PMT 270. In some embodiments of the invention, the forwarding plane provides the controller access to the first entry of the PMT by, responsive to the receiving of the pull entry request message, transmitting a pull entry response message to the controller that includes the first entry of the PMT 280.

Figure 3:
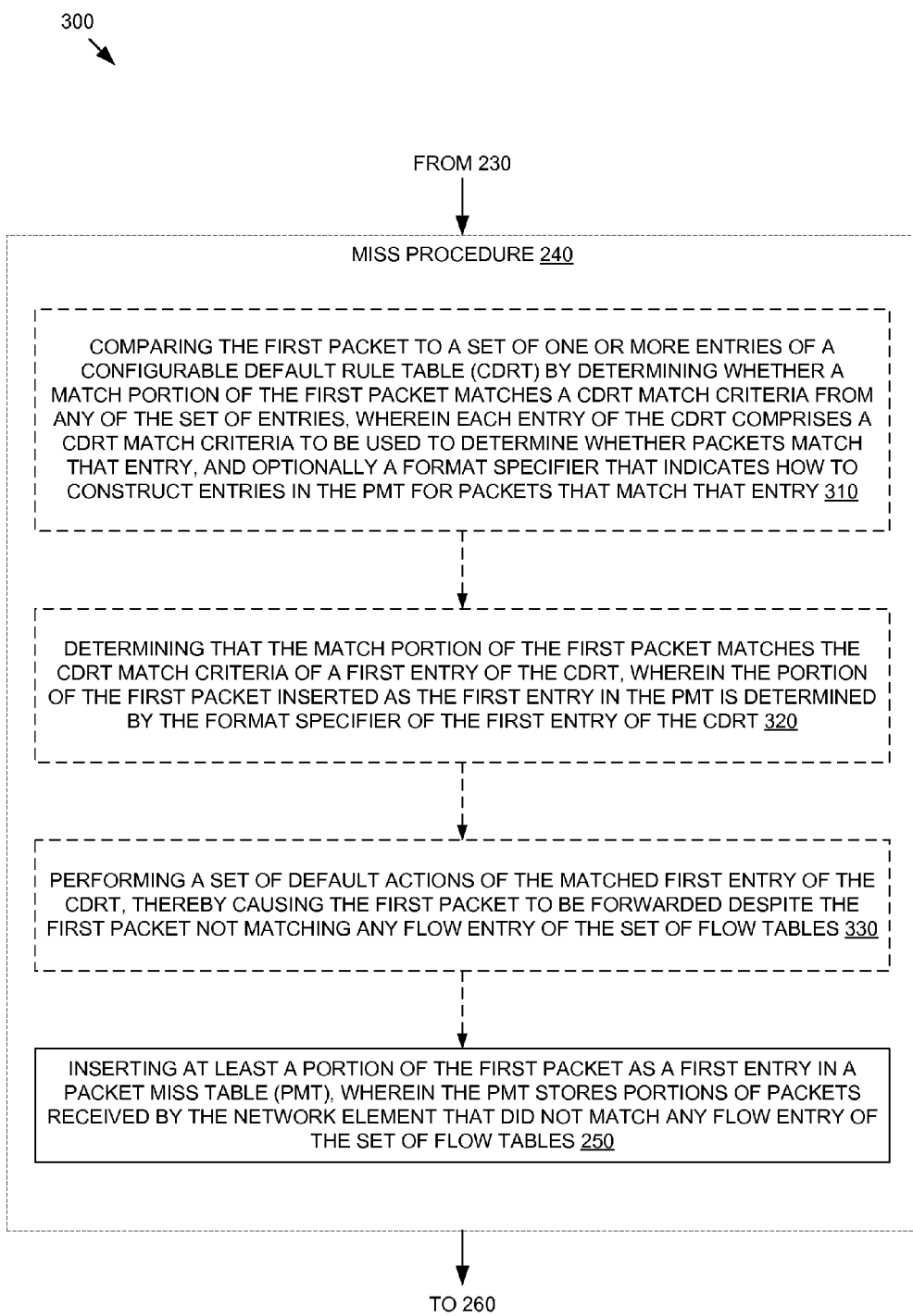
FIG. 3 illustrates a miss procedure performed by a forwarding element in a software-defined network for accelerating forwarding according to one embodiment of the invention.

FIG. 3 illustrates a miss procedure 300 performed by a forwarding plane in a software-defined network for accelerating forwarding according to one embodiment of the invention. This miss procedure 300 illustrates one possible embodiment of the miss procedure 240 of FIG. 2.

At 210, the forwarding plane compares the first packet to a set of one or more entries of a configurable default rule table (CDRT). This comparison occurs through determining whether a match portion of the first packet matches a CDRT match criteria from any of the set of entries 310. Each entry of the CDRT includes a CDRT match criteria to be used to determine whether packets match that entry. In some embodiments, each entry of the CDRT also includes a format specifier that indicates how to construct entries in the PMT for packets having the match portion that matches the CDRT match criteria of that entry.

The forwarding plane then determines that the match portion of the first packet does match the CDRT match criteria of a first entry of the CDRT 320. The portion of the first packet inserted as the first entry in the PMT is determined by the format specifier of the first entry of the CDRT. Then, the forwarding plane performs a set of default actions of the matched first entry of the CDRT, thereby causing the first packet to be forwarded despite the first packet not matching any flow entry of the set of flow tables 330. Next, just as in FIG. 2, the forwarding plane inserts at least a portion of the first packet as a first entry in a packet miss table (PMT) 250. The PMT stores portions of packets received by the network element that did not match any flow entry of the set of flow tables.

Figure 4:
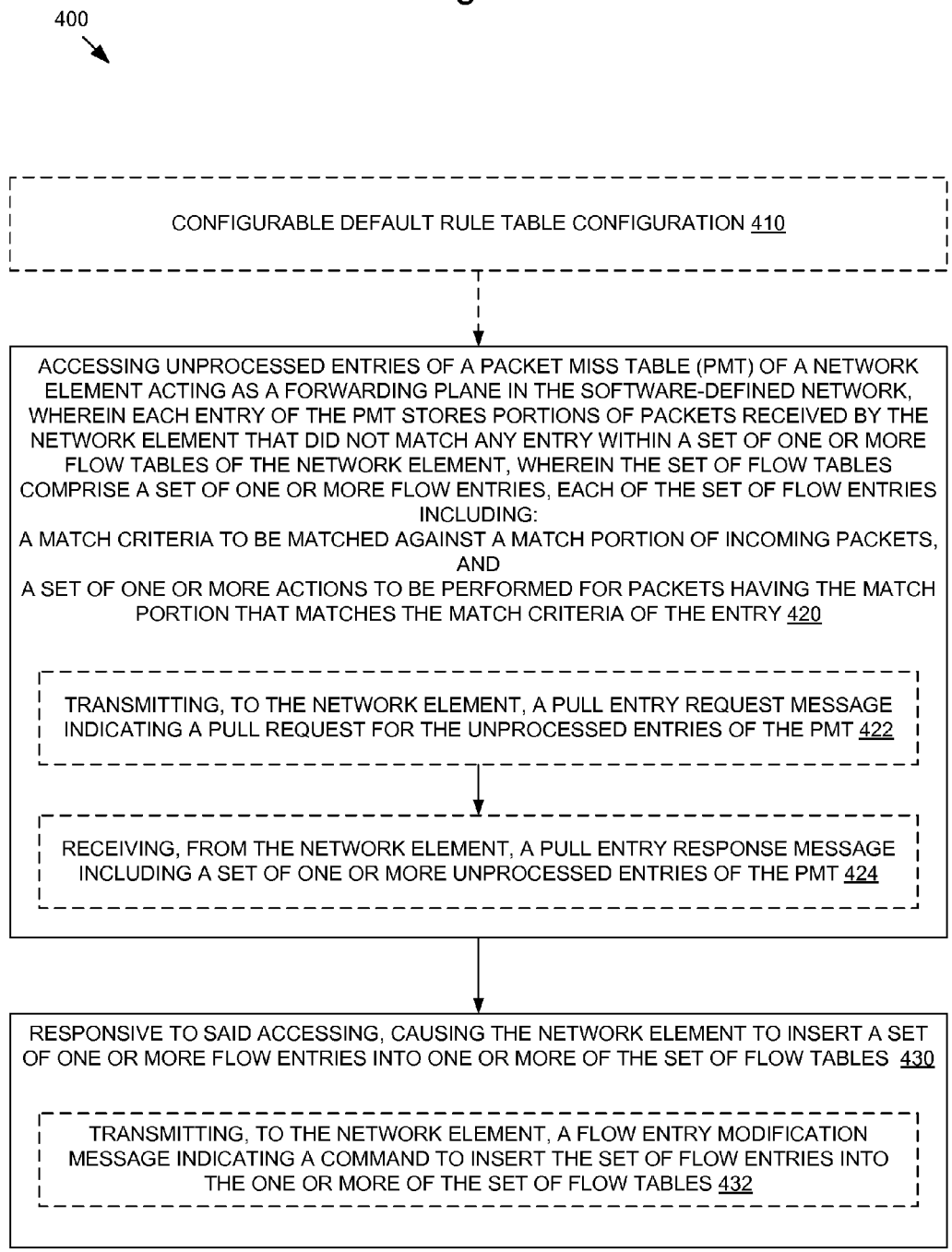
FIG. 4 illustrates a flow performed by a controller in a software-defined network for accelerating forwarding according to one embodiment of the invention.

FIG. 4 illustrates a flow 400 performed by a controller in a software-defined network for accelerating forwarding according to one embodiment of the invention. In some embodiments of the invention, the controller performs configurable default rule table configuration, which is further detailed in FIG. 5.

At 420, the controller accesses unprocessed entries of a packet miss table (PMT) of a network element acting as a forwarding plane in the software-defined network. Each entry of the PMT stores portions of packets received by the network element that did not match any entry within a set of one or more flow tables of the network element. The set of flow tables include a set of one or more flow entries, each of which includes a match criteria to be matched against a match portion of incoming packets. Each of the set of flow entries also includes a set of one or more actions to be performed for packets having the match portion that matches the match criteria of that entry.

In some embodiments of the invention, the controller performs the accessing by transmitting, to the network element, a pull entry request message indicating a pull request for the unprocessed entries of the PMT 422. In some embodiments, the controller then receives, from the network element, a pull entry response message including a set of one or more unprocessed entries of the PMT 424.

At 430, the controller, responsive to said accessing, causes the network element to insert a set of one or more flow entries into one or more of the set of flow tables. In some embodiments of the invention, this occurs by the controller transmitting, to the network element, a flow entry modification message indicating a command to insert the set of flow entries into the one or more of the set of flow tables 432.

Figure 5:
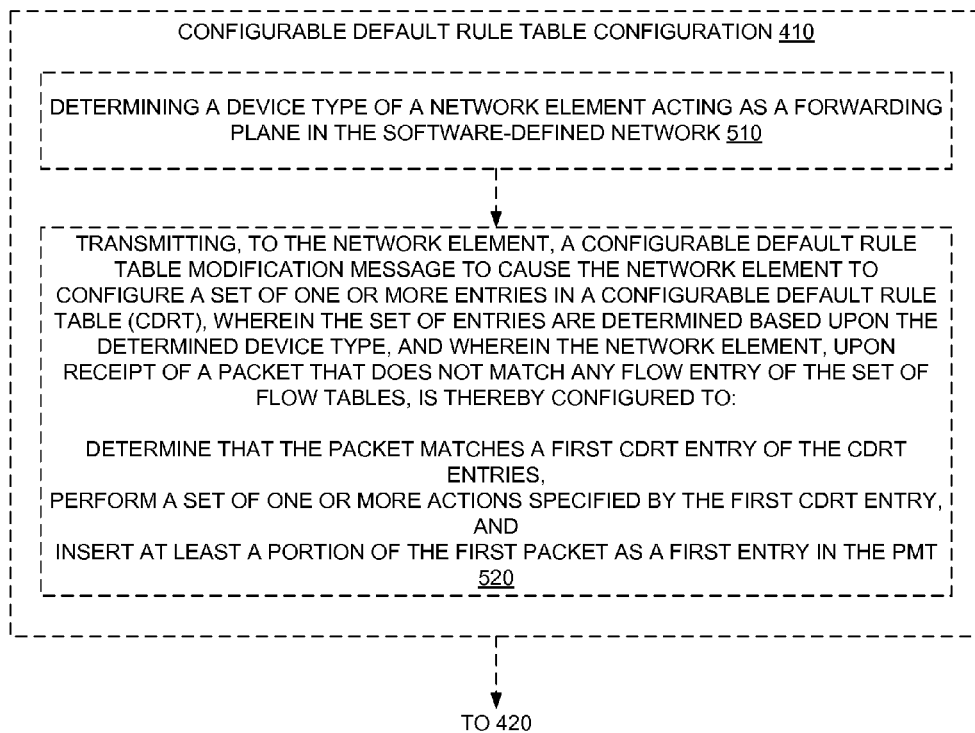
FIG. 5 illustrates a configurable default rule table configuration procedure performed by a controller in a software-defined network for accelerating forwarding according to one embodiment of the invention.

FIG. 5 illustrates a configurable default rule table configuration procedure 500 performed by a controller in a software-defined network for accelerating forwarding according to one embodiment of the invention. In an embodiment of the invention, the controller performs the configurable default rule table (CDRT) configuration 410 by first determining a device type of a network element acting as a forwarding plane in the software-defined network 510.

Then, the controller transmits, to the network element, a configurable default rule table modification message to cause the network element to configure a set of one or more entries in a configurable default rule table (CDRT) 520. These entries in the set of entries are determined based upon the determined device type. Accordingly, the network element, upon receipt of a packet that does not match any flow entry of the set of flow tables, is thereby configured to determine that the packet matches a first CDRT entry of the CDRT entries, perform a set of one or more actions specified by the first CDRT entry, and insert at least a portion of the first packet as a first entry in the PMT 520.

Configurable Default Rule Table Configuration Options

As previously described, the Configurable Default Rule Table (CDRT) includes CDRT entries 143 that include one or more default actions 146 specifying processing decisions for packets that "miss" in the flow tables 116A-116N. There are many possibilities for what the default actions 146 may be. For example, if the device type of the forwarding device (i.e. network element 112) is an Ethernet switching device, a useful default action may be to forward a matching packet to all ports in the same Virtual Local Area Network (VLAN) as the packet. Or, if the device type of the forwarding device being programmed is a routing device, a useful default action may be to forward the packet to all members within a particular subnet. If the device type is a firewall, a useful default action might be to drop the packet, which configures the forwarding element to err on the side of caution. Further, if the device type of the forwarding element being programmed is a load balancing device, the default action might instruct the forwarding element to distribute the load (perhaps by using a very broad CDRT match criteria 144 in a CDRT entry 143 to match a wide variety of traffic) according to a particular load distribution scheme, such as Round-Robin, random choice, etc.

Packet Miss Table Implementation Options

In some embodiments of the invention, the Packet Miss Table (PMT) 120 might be made to appear to the control module 104 as a ring buffer; which would make it unnecessary for the control module 104 to need to reset its row counter and this might make it unnecessary for the underlying hardware to explicitly remove rows that have been processed by the controller. In other embodiments, the PMT 120 may simply be implemented using an incremented row counter with wrap. In this case, the network element 112 could simply create a new row (if there is not a current corresponding entry) by writing the new content to the next row indicated by the row counter and incrementing the row counter. Thus, there would be no reason for the control module 104 to mark a row as "processed" unless the implementation in the control module 104 itself uses this information—the hardware would overwrite the next row whether it was being, or had been, processed. However, this approach is mostly incompatible with an approach that uses a hash process to determine if a matching entry exists and to place new entries.

In other embodiments, the network element 112 implements a hash algorithm to select a row of the PMT 120 into which to write a supposed "new" entry. If this approach is used, the network element 112 avoids the need to check if an entry exists, since—if it does exist—the hash algorithm should be one that would cause such an entry to overwrite the existing, identical, entry. In embodiments utilizing this approach, there is a computable probability that a hash collision will occur, causing an entry to be overwritten by another entry that is not the same. However, as entries are processed by the controller, the probability of subsequent collisions reduces. In addition to selecting a hash algorithm that ensures an entry would necessarily replace itself, the hash algorithm should also be chosen (and possibly multiple alternative algorithms provided) such that the probability of collision is minimal for the data plane local memory allocated for this purpose.

Additionally, there is an advantage (specially, in cases where the control module 104 is collocated with data plane 151) to having the underlying hardware provide some sort of notification to the control module 104 that a new entry has been made in the PMT 120 in a way that allows the control module 104 to easily determine that it has processed all existing entries. This can be implemented in any number of ways, but one embodiment that avoids constant interruption of the control module 104 is to have a counter that holds the number of new entries created by data plane 151 processing (i.e. the packet processing module 114) since the last time the counter was read by the control module 104. In these embodiments, the counter is reset when read.

Each PMT entry 147 may be organized in a number of possible ways. For example, in an embodiment each PMT entry 147 contains a form of a non-illustrated receipt context (e.g., the port on which the corresponding packet was received) and the first N bits/bytes of the packet (i.e. the packet portion 149), where the value of N is an implementation choice. However, in other embodiments greater efficiency is achieved through use of a more complex row semantic, where, in addition to the stored receipt context, there is a format specifier (or index into a format specification table) with a finite number of "well-known" (commonly understood by the data and control planes) formats. This format specifier is accompanied by the key contents associated with each format, formatted according to the format specifier. In certain embodiments, the order of the PMT entry 147 contents is not special and thus the fields in a PMT entry 120 may be ordered in any sequence. In certain embodiments, format specifiers include a format for key fields in common Ethernet frame headers, IPv4 and IPv6 headers, TCP and User Datagram Protocol (UDP) port numbers, etc., as well as certain combinations of these.

Additionally, there are many options for a mechanism for pulling the information from the PMT 120 to the control module 104. It is a up to the implementer to decide what kind of protocols/mechanism the particular implementation will use to pull the packet from the PMT 120 of the data plane 151 to the control module 104. However, it is important that a particular implementation of a protocol considers the cost of increased packet flow between control module 104 and data plane 151 as compared to the existing solutions such as Open-Flow. In particular, the implementer should consider the following four points when deciding the preferred mechanisms to pull the PMT 120 information from data plane 151:

(1) What are the processing capabilities and software architecture of the control module 104?

(2) What is the number of buffers available in the forwarding elements and in the control module 104?

(3) Are the control plane 150 and data plane 151 co-located? For example, with a management card of a chassis acting as a control module 104 and one or more line card(s) acting as data plane 151, the control plane 150 and data plane 151 are co-located and signaling between the two may have a relatively low cost. Additionally, in the case where control plane 150 and data plane 151 are co-located, implementers can use a mechanism like Direct Memory Access (DMA) to pull the packet from the data plane 151.

(4) Is the control module 104 a separate node in the network? In this case, it is important to consider the network between the control module 104 and the number of forwarding nodes that a particular control module 104 is controlling. In the case where control module 104 is a separate network node, an implementer can choose to implement some protocol that allows batching of the information retrieved by the control module 104. This protocol can be a standard based protocol or a proprietary protocol. One such example is where the control module 104 periodically sends a 'Probe Message' to the forwarding device to check if there exists any entry in the PMT 120 that requires control module 104 processing. The control module 104 can use this 'Probe Message' to study the state of the network and available buffers in data plane 151 and control plane 150. For example, the 'Probe Message' can be used to calculate the 'total round trip time' (RTT), and/or the maximum size of a packet that can flow through the network between control module 104 and data-plane without fragmentation (i.e. a Maximum Transmission Unit (MTU)).

The control module 104 can also use the 'Probe Message' to instruct the PMT 120 to arrange the unprocessed PMT entries 148 in an order based on time stamp (e.g. the most recent entry is on the top of the table and to be picked up first), a counter (e.g. the entry having a maximum number of hits is on the top of the table and to be picked up first), or First In First Out (FIFO)/reverse timestamp (e.g., the control module 104 picks up entries for processing in the order they were created).

Based upon the information the control module 104 has determined (e.g., network MTU, RTT, and a count of available buffers), the control module 104 may send a 'Pull Entry-Request' message 134 to the data plane 151. This message, in some embodiments, contains the information detailing how many of the unprocessed entries 148 can be packed into a single 'Pull Entry-Response' message 136. In an embodiment, the 'Pull Entry-Request" message 134 includes information detailing the number of messages that were successfully delivered (and processed) at the control module 104 from the last "Pull Entry-Response" message 136.

Another embodiment includes configuring the control module 104 to request one PMT entry 147 from the forwarding device 112 at a time. The implementation for this approach is very simple, involving a straightforward request/response mechanism in which the control module 104 requests a PMT entry (for example, a next PMT entry) from the PMT 120 of the forwarding device 112, and receives: 1) a response containing that entry, 2) an error message (possibly indicating that no unprocessed entries currently exist, or possibly indicating some other problem with the request), or 3) no response (this may be the preferred approach in the event that the forwarding device 112 has no information to send). In certain embodiments, failing to receive a response from the forwarding device 112 is not necessarily an indication of a failure, as there may be other ways for the control module 104 and forwarding device 112 to each determine the "liveness" of the other.

Another approach utilizes a batching mechanism to reduce the amount of traffic generated when requesting unprocessed entries 148 of the PMT 120. In this approach, the control module 104 requests an integral number of entries from the forwarding device's 112 PMT 120. In one embodiment, this approach utilizes a tunable parameter (that can be set by the operator) with a default value indicating a number of rows to attempt to fetch at once. In one embodiment, the default value indicates that the control module 104 is to request the next 10 entries. In embodiments utilizing such a batching mechanism, the control module 104 will get one of the following: 1) a response containing the requested number of entries—or less—along with an indication of the number of entries returned; optionally, the message format may contain an error code that will indicate the reason why a lower number of entries was returned than was requested (the most likely reason is that there were fewer rows available than were requested); or 2) no response. As with the previous embodiment that requests one PMT entry 147 at a time, receiving no response may be preferred if there are no rows to provide.

A third embodiment for requesting unprocessed entries 148 of the PMT is to use a distributed shared memory (DSM) architecture. This may be supported by the operating system or another application running on the systems involved. In these embodiments, the content of the forwarding device's PMT 120 is kept in a virtual shared memory space and shared by way of the coherency protocol utilized. Accordingly, no explicit messaging is required. For this usage, a DSM architecture based on "weak consistency" is sufficient, as it is not of long term importance if a forwarding device has overwritten an entry that the control module 104 is currently working on.

The method for selecting the approach for PMT entry 147 retrieval may be governed by any reasonable policy. Ordering by most recently created rows may make sense if there is a concern that older entries may correspond to flows that have completed. Ordering by using a "hit counter" for each entry in the PMT 120 (which is incremented each time the entry is re-written as a result of yet another packet matching this PMT entry 147) is another approach.

Finally, any control module 104 implementation—knowing that a request is required in order to receive any flow information from the forwarding device—will periodically send a new request, even if it has received no entries for all recent requests. In this way, it is unnecessary for the forwarding device to send a response if there is nothing to send, and it is relatively unimportant that messages are delivered using a reliable delivery mechanism (such as TCP).

In times of abnormal network load, the described embodiments permit the control module 104 to regulate the pace at which it processes flows, but at the cost of timely reprogramming of the network forwarding path. The expectation is that in many cases the default actions of the CDRT entries may offer acceptable performance and the control module 104 is only required to intervene in specific cases. Where there is latency in obtaining forwarding information from the data-plane, this information may have been augmented with additional telemetry on the current flow state to allow the control module 104 to prioritize processing of the retrieved information. This could be in the form of a time that a last packet was received, a rate of receipt over a given time window, etc., that would permit the control module 104 to determine the most effective actions it could take given the current network state and perceived state of the existing flow set.

The embodiments described herein offer substantial benefits compared to the typical approaches provided in existing SDN technologies. For example, OpenFlow, for the worst-case, could send all packets to the control module 104. While OpenFlow "Packet-In' and "Packet-Out" messages were designed to optimize buffer use, the use of these mechanisms further increases to the number of packets flowing in the network, as well as the overhead associated with their use by the control module 104.

Additionally, in networks where a certain amount of learning is needed at each network forwarding node after a transition, congestion induced by slow-path packet processing (both on the controller and in the network) can become severe when there is a transition—such as an addition of a new node/failure of an existing node. The approach of certain embodiments of this invention reduces congestion on the controller, and therefore also reduces both loss of knowledge and wasted bandwidth when a network transition occurs. The controller pulls packet information at its own convenience, thereby avoiding congestion. Packets are forwarded using default rules until the controller is able to programs entries in each such device.

Another issue with potential approaches to dealing with this "learning process" is that—as a result of delay in the process—it is possible that several similar packets may be forwarded to the controller. Repetition of the packet information is an unnecessary burden on a data-plane and controller, and adds to congestion. The approach of embodiments of this invention further reduces the processing requirements imposed on the controller by avoiding sending multiple packet matching a given generic match criteria to the controller, in any given time period.

Additionally, the usual method for avoiding overload of the controller is to simply disable such messaging for a new node—along with forwarding of any packets—until configuration of that node is complete. The approach in embodiments of this invention allows the forwarding device to be enabled with a partial configuration. Certain embodiments also allow the use of packet-based rule creation as a mechanism to help the controller—as well as any applicable third party software application—to prioritize remaining configuration tasks.

Also, slow path processing for causes delays for the first few packets of a flow that will not be experienced by other packets. The approach of embodiments of this invention also reduces the incidence of certain potentially pathological networking events (such as out of order delivery of packets) by eliminating delay consequent to packet processing in the (slow path) control plane.

In a network that has nodes that support pushing the packet to the controller for processing, that controller does not have option to decide which nodes are important and hence give priority to a particular node when receiving packet from the data-pane node. The approach of embodiments of the invention allows for prioritization of packet processing from a given data-plane node. Since the controller is pulling the information (instead of being pushed the information, as in the OpenFlow model) from the data plane, it can decide which node(s) it wants to gather information from first.

Moreover, in the described embodiments, there is no loss of knowledge as would be implied by congestion and discard, as these techniques deal with congestion via summarization and augmentation of information at the data plane.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A method performed by a network element acting as a forwarding plane within a software-defined network to reduce negative effects of slow-path packet processing, comprising:

receiving, by the network element, a first packet;

determining whether the first packet matches any flow entry within a set of one or more flow tables of the network element, wherein the set of flow tables comprise a set of one or more flow entries, each of the set of flow entries including a match criteria to be matched against a match portion of incoming packets and a set of one or more actions to be performed for packets having said match portions matching the match criteria of that flow entry;

responsive to determining that the first packet does not match any flow entry within the set of flow tables, performing a miss procedure comprising:

comparing the first packet to a set of one or more entries of a configurable default rule table (CDRT) by determining whether a match portion of the first packet matches a CDRT match criteria from any of the set of entries, wherein each entry of the CDRT comprises the CDRT match criteria to be used to determine whether packets match that entry, and inserting at least a portion of the first packet as a first entry in a packet miss table (PMT), wherein the PMT stores portions of packets received by the network element that did not match any flow entry of the set of flow tables; and providing, to a controller, access to the first entry of the PMT upon the controller seeking said access.

2. The method of claim 1, wherein each entry of the CDRT further comprises a format specifier that indicates how to construct entries in the PMT for packets that match the entry.

3. The method of claim 2, wherein the format specifier comprises a bitmap indicating which bytes from a matching packet are to be used to construct a new entry in the PMT for the matching packet.

4. The method of claim 2, wherein the miss procedure further comprises:

determining that the match portion of the first packet matches the CDRT match criteria of a first entry of the CDRT, wherein the portion of the first packet inserted as the first entry in the PMT is determined by the format specifier of the first entry of the CDRT.

5. The method of claim 4, wherein:

each entry of the CDRT further comprises a set of one or more default actions to be performed for packets that match the CDRT match criteria of that entry; and the miss procedure further comprises performing the set of default actions of the matched first entry of the CDRT, thereby causing the network element to perform forwarding of the first packet despite the first packet not matching any flow entry of the set of flow tables.

6. The method of claim 5, further comprising:

responsive to receiving a set of one or more CDRT modification messages from the controller, inserting a new CDRT entry into the CDRT based upon the set of CDRT modification messages.

7. The method of claim 5, wherein at least some of the set of entries of the CDRT are populated by the controller based upon a functionality the network element is to provide in the software-defined network and are not based upon packets received by the network element.

8. A method performed by a first network element acting as a controller within a software-defined network to reduce negative effects of slow-path packet processing, comprising:

accessing unprocessed entries of a packet miss table (PMT) of a second network element acting as a forwarding plane in the software-defined network, wherein each entry of the PMT stores portions of packets received by the second network element that did not match any entry within a set of one or more flow tables of the second network element, wherein the set of flow tables comprise a set of one or more flow entries, each of the set of flow entries including a match criteria to be matched against a match portion of incoming packets and a set of one or more actions to be performed for packets having the match portions that match the match criteria of the flow entry; and responsive to said accessing, causing the second network element to insert a set of one or more flow entries into one or more of the set of flow tables.

9. The method of claim 8, wherein said accessing comprises:

transmitting, to the second network element, a pull entry request message indicating a pull request for the unprocessed entries of the PMT; and receiving, from the second network element, a pull entry response message including a set of one or more unprocessed entries of the PMT.

10. The method of claim 8, wherein said causing comprises:

transmitting, to the second network element, one or more flow entry modification messages indicating a command to insert the set of flow entries into the one or more of the set of flow tables.

11. The method of claim 8, further comprising:

determining a device type of the second network element; and transmitting, to the second network element, a configurable default rule table modification message to cause the second network element to configure a set of one or more entries in a configurable default rule table (CDRT), wherein the set of entries are determined based upon the determined device type, and wherein the second network element, upon receipt of a packet that does not match any flow entry of the set of flow tables, is thereby configured to:

determine that the packet matches a first CDRT entry of the CDRT entries, perform a set of one or more default actions specified by the first CDRT entry, and insert at least a portion of the first packet as a first entry in the PMT.

12. A network element to act as a forwarding plane within a software-defined network (SDN) and reduce negative effects of slow-path packet processing, the network element comprising:

a set of one or more physical network interfaces configured to:

receive packets to be forwarded, and provide, for a controller in the SDN, access to unprocessed entries of a packet miss table (PMT) upon the controller seeking said access, wherein the PMT is to store portions of packets received by the set of physical network interfaces that do not match any flow entry of a set of one or more flow tables, wherein said set of physical network interfaces is to provide said access by being configured to:

receive, from the controller, pull entry request messages that indicate pull requests for the unprocessed entries of the PMT, and transmit, to the controller, pull entry response messages that comprise one or more of said unprocessed entries of the PMT; and a packet processing module configured to:

configure the set of one or more flow tables comprising a set of one or more flow entries, each of the set of flow entries including a match criteria to be matched against match portions of incoming packets and a set of one or more actions to be performed for packets having said match portions that match the match criteria of that flow entry, determine whether match portions of received packets match the match criteria of any of the set of flow entries of the set of flow tables, and perform a miss procedure when a received packet does not match any entry of the set of flow tables, wherein the miss procedure is one of:

inserting at least a portion of the received packet as an entry of the PMT, and updating an existing entry of the PMT based upon the received packet.

13. The network element of claim 12, wherein the packet processing module is further configured to:

responsive to a receipt of a set of one or more flow entry modification messages over one of the set of physical network interfaces, insert a flow entry into one of the set of flow tables, and modify at least one entry of the PMT to be no longer unprocessed, wherein the set of flow entry modification messages is to indicate a command to insert the flow entry into the one of the set of flow tables.

14. The network element of claim 12, wherein the miss procedure further comprises:

comparing the received packet to a set of one or more entries of a configurable default rule table (CDRT) by determining whether a match portion of the received packet matches a CDRT match criteria of any of the set of entries, wherein each entry of the CDRT comprises the CDRT match criteria to be used to determine whether packets match that entry.

15. The network element of claim 14, wherein each entry of the CDRT further comprises a format specifier to indicate how to construct entries in the PMT for packets matching that entry.

16. The network element of claim 14, wherein the packet processing module is further configured to, responsive a receipt of a set of one or more CDRT modification messages from the controller over at least one of the set of physical network interfaces, insert a new entry into the CDRT based on the set of CDRT modification messages.

17. A network element to act as a controller within a software-defined network and reduce negative effects of slow-path packet processing, the network element comprising:

a set of one or more physical network interfaces; and a control module coupled to the set of physical network interfaces and configured to:

access unprocessed entries of a packet miss table (PMT) of a second network element acting as a forwarding plane in the software-defined network, wherein each entry of the PMT stores portions of packets received by the second network element that did not match any entry within a set of one or more flow tables of the second network element, wherein the set of flow tables comprise a set of one or more flow entries, each of the set of flow entries to include a match criteria to be matched against match portions of incoming packets and a set of one or more actions to be performed for packets having said match portions that match the match criteria of that flow entry, and responsive to said access of unprocessed entries of the PMT, transmit, to the second network element, one or more flow entry modification messages that indicate a command to insert a set of one or more flow entries into one or more of the set of flow tables.

18. The network element of claim 17, wherein the control module is to access unprocessed entries of the PMT by being configured to:

transmit pull entry request messages to the second network element, wherein each pull entry request message is to indicate a pull request for one or more unprocessed entries of the PMT; and receive pull entry response messages from the second network element, wherein each pull entry response message is to include a set of one or more of the unprocessed entries of the PMT.

19. The network element of claim 17, wherein the control module is further configured to:

determine a device type of the second network element; and utilize the set of physical network interfaces to transmit, to the second network element, a configurable default rule table modification message to cause the second network element to configure a set of one or more entries in a configurable default rule table (CDRT), wherein the CDRT includes default actions to be performed for received packets that cannot be processed according to a set of flow tables, wherein the set of entries are determined based upon the determined device type, and wherein the second network element, upon receipt of a packet that does not match any flow entry of the set of flow tables, is configured to:

determine whether the packet matches any CDRT entry of the set of CDRT entries, and responsive to determining that the packet matches a first CDRT entry of the set of CDRT entries, perform a set of one or more default actions specified by the first CDRT entry, and insert at least a portion of the first packet as a first entry in the PMT or update an existing entry of the PMT based upon the first packet.

20. A method performed by a forwarding node within a software-defined network to reduce negative effects of slow-path packet processing, comprising:

receiving, by the forwarding node, a first packet;

determining whether the first packet matches any flow entry within a set of one or more flow tables of the forwarding node, wherein the set of flow tables comprise a set of one or more flow entries, each of the set of flow entries including a match criteria to be matched against a match portion of incoming packets and a set of one or more actions to be performed for packets having said match portion that matches the match criteria;

responsive to determining that the first packet does not match any flow entry within the set of flow tables, performing a miss procedure comprising:

inserting at least a portion of the first packet as a first entry in a packet miss table (PMT), wherein the PMT stores portions of packets received by the forwarding node that did not match any flow entry of the set of flow tables;

receiving a pull entry request message from a controller indicating a pull request for one or more unprocessed entries of the PMT; and responsive to the receiving of the pull entry request message, transmitting a pull entry response message to the controller, the pull entry response message comprising the first entry of the PMT.

21. A method performed by a controller executing on a server within a software-defined network to reduce negative effects of slow-path packet processing, comprising:

transmitting, to a forwarding node in the software-defined network, a pull entry request message indicating a pull request for one or more unprocessed entries of a packet miss table (PMT), wherein each entry of the PMT stores portions of packets received by the forwarding node that did not match any entry within a set of one or more flow tables of the forwarding node, wherein the set of flow tables comprises a set of one or more flow entries, each of the set of flow entries including a match criteria to be matched against a match portion of incoming packets and a set of one or more actions to be performed for packets having the match portion that matches the match criteria of that flow entry;

receiving, from the forwarding node, a pull entry response message including a set of one or more unprocessed entries of the PMT; and responsive to receipt of the pull entry response message, transmitting, to the forwarding node, one or more flow entry modification message indicating a command to insert a set of one or more flow entries into one or more of the set of flow tables.

22. A method performed by a network element acting as a forwarding plane within a software-defined network to reduce negative effects of slow-path packet processing, comprising:

receiving, by the network element, a first packet;

determining whether the first packet matches any flow entry within a set of one or more flow tables of the network element, wherein the set of flow tables comprise a set of one or more flow entries, each of the set of flow entries including a match criteria to be matched against a match portion of incoming packets and a set of one or more actions to be performed for packets having said match portions matching the match criteria of that flow entry;

responsive to determining that the first packet does not match any flow entry within the set of flow tables, performing a miss procedure comprising:

inserting at least a portion of the first packet as a first entry in a packet miss table (PMT), wherein the PMT stores portions of packets received by the network element that did not match any flow entry of the set of flow tables; and providing, to a controller, access to the first entry of the PMT upon the controller seeking said access, wherein the controller seeking said access comprises the network element receiving, from the controller, a pull entry request message indicating a request for one or more unprocessed entries of the PMT, and providing said access to the first entry comprises transmitting a pull entry response message to the controller, the pull entry response message comprising the first entry of the PMT.

23. The method of claim 22, wherein the pull entry response message transmitted to the controller further comprises a second entry of the PMT.

24. A method performed by a network element acting as a forwarding plane within a software-defined network to reduce negative effects of slow-path packet processing, comprising:

receiving, by the network element, a first packet;

determining whether the first packet matches any flow entry within a set of one or more flow tables of the network element, wherein the set of flow tables comprise a set of one or more flow entries, each of the set of flow entries including a match criteria to be matched against a match portion of incoming packets and a set of one or more actions to be performed for packets having said match portions matching the match criteria of that flow entry;

responsive to determining that the first packet does not match any flow entry within the set of flow tables, performing a miss procedure comprising:

inserting at least a portion of the first packet as a first entry in a packet miss table (PMT), wherein the PMT stores portions of packets received by the network element that did not match any flow entry of the set of flow tables;

providing, to a controller, access to the first entry of the PMT upon the controller seeking said access;

receiving, from the controller, one or more flow entry modification messages indicating a command to insert a first flow entry into one of the set of flow tables;

inserting the first flow entry into the one of the set of flow tables, wherein the match criteria of the first flow entry matches a match portion of the first packet; and modifying the first entry of the PMT to be no longer unprocessed.

* * * * *

UNITED STATES PATENT AND TRADEMARK OFFICE
CERTIFICATE OF CORRECTION

| | | |
|---|---|---|
| PATENT NO. | : 9,071,529 B2 | Page 1 of 1 |
| APPLICATION NO. | : 13/647100 | |
| DATED | : June 30, 2015 | |
| INVENTOR(S) | : Garg et al. | |

It is certified that error appears in the above-identified patent and that said Letters Patent is hereby corrected as shown below:

On the Title Page, item (74), under "Attorney, Agent, or Firm", in Column 2, Line 2, delete "Elliot" and insert -- Elliott --, therefor.

In the specification

Column 14, Line 28, delete "unprocessed entries 146." and insert -- unprocessed entries 148. --, therefor.

Signed and Sealed this
Fifth Day of January, 2016

Michelle K. Lee
*Director of the United States Patent and Trademark Office*